US011640373B2

(12) United States Patent
Yamamoto et al.

(10) Patent No.: US 11,640,373 B2
(45) Date of Patent: May 2, 2023

(54) REORDERING FILES

(71) Applicant: International Business Machines Corporation, Armonk, NY (US)

(72) Inventors: Noriko Yamamoto, Tokyo (JP); Tohru Hasegawa, Tokyo (JP); Tsuyoshi Miyamura, Yokohama (JP); Hiroshi Itagaki, Yokohama (JP); Shinsuke Mitsuma, Higashimurayama (JP); Sosuke Matsui, Machida (JP)

(73) Assignee: International Business Machines Corporation, Armonk, NY (US)

(*) Notice: Subject to any disclaimer, the term of this patent is extended or adjusted under 35 U.S.C. 154(b) by 161 days.

(21) Appl. No.: 17/118,338

(22) Filed: Dec. 10, 2020

(65) Prior Publication Data

US 2022/0188269 A1   Jun. 16, 2022

(51) Int. Cl.
*G06F 16/00* (2019.01)
*G06F 16/13* (2019.01)

(52) U.S. Cl.
CPC ................................. *G06F 16/13* (2019.01)

(58) Field of Classification Search
None
See application file for complete search history.

(56) References Cited

U.S. PATENT DOCUMENTS 5,905,520 A * 5/1999 Fujii ................. B65H 31/3054
347/153
6,128,627 A * 10/2000 Mattis ................... G06F 16/221

(Continued)

FOREIGN PATENT DOCUMENTS

JP      H06044118 A   2/1994
JP      2010079549 A   4/2010
(Continued)

OTHER PUBLICATIONS

Miyoshi et al., "IBM Spectrum Archive Enterprise Edition V1.3.0.6 Installation and Configuration Guide," IBM Redbooks, Feb. 2020, 326 pages.

(Continued)

*Primary Examiner* — Hasanul Mobin

(74) *Attorney, Agent, or Firm* — Zilka-Kotab, P.C.

(57) ABSTRACT

A method includes, for files in a storage system requested in sequence by an application, identifying a pre-file and identifying a post-file requested after the pre-file. The method also includes incrementing a pre-read count for the pre-file in file attributes associated with the pre-file and incrementing a post-read count for the post-file in file attributes associated with the post-file. The method includes selecting a position in a save list for each file based on the pre-read and post-read counts and saving the files on tape media according to the relative positions of the files in the save list. A computer program product includes one or more computer readable storage media and program instructions collectively stored on the one or more computer readable storage media. The program instructions includes program instructions to perform foregoing method. A system includes a processor and logic configured to perform the foregoing method.

20 Claims, 6 Drawing Sheets

(56) References Cited

U.S. PATENT DOCUMENTS

| | | | | |
|---|---|---|---|---|
| 6,154,852 | A * | 11/2000 | Amundson | G06F 11/1456 714/E11.122 |
| 6,421,308 | B1 * | 7/2002 | Kizu | G11B 7/00718 |
| 9,595,291 | B1 | 3/2017 | Kawamura et al. | |
| 2001/0050116 | A1 * | 12/2001 | Skell | B67D 1/1236 141/2 |
| 2011/0125950 | A1 * | 5/2011 | Haustein | G06F 12/0868 711/111 |
| 2013/0145082 | A1 * | 6/2013 | Tamagawa | G06F 12/0246 711/103 |
| 2013/0258516 | A1 * | 10/2013 | Katagiri | G11B 15/442 |
| 2014/0371902 | A1 * | 12/2014 | McClelland | G11B 15/674 700/218 |
| 2014/0379980 | A1 * | 12/2014 | Hasegawa | G06F 3/065 711/111 |
| 2015/0089156 | A1 * | 3/2015 | Clohset | G06T 15/06 711/141 |
| 2015/0242136 | A1 * | 8/2015 | Lin | G06F 3/0611 711/114 |
| 2016/0076093 | A1 * | 3/2016 | Shendure | C12N 15/102 506/10 |
| 2017/0011544 | A1 * | 1/2017 | Clohset | G06T 15/005 |
| 2017/0046077 | A1 * | 2/2017 | Whitney | G06F 3/0643 |
| 2018/0157413 | A1 | 6/2018 | Kawamura et al. | |

FOREIGN PATENT DOCUMENTS

| | | |
|---|---|---|
| JP | 2012128937 A | 7/2012 |
| JP | 2015072566 A | 4/2015 |

OTHER PUBLICATIONS

IBM, "Introduction to IBM Spectrum Archive Enterprise Edition," IBM Knowledge Center, 2020, 4 pages, retrieved from https://www.ibm.com/support/knowledgecenter/ST9MBR_1.2.6/ltfs_ee_intro.html on Jan. 22, 2020.

IBM, "Average block locate time from load point for 3592 tape drives," IBM Knowledge Center, 2020, 2 pages, retrieved from https://www.ibm.com/support/knowledgecenter/STQRQ9/com.ibm.storage.ts4500.doc/average_block_locate_time_3592.html on Jan. 22, 2020.

IBM, "Performance specifications for 3592 tape drives," IBM Knowledge Center, 2020, 2 pages, retrieved from https://www.ibm.com/support/knowledgecenter/STQRQ9/com.ibm.storage.ts4500.doc/performance_specs_3592_drives.html on Jan. 22, 2020.

IBM, "Rewind times for 3592 tape drives," IBM Knowledge Center, 2020, 2 pages, retrieved from https://www.ibm.com/support/knowledgecenter/STQRQ9/com.ibm.storage.ts4500.doc/rewind_times_3592_drives.html on Jan. 22, 2020.

SNIA, "Linear Tape File System (LTFS) Format Specification," SNIA, 2020, 3 pages, retrieved from https://www.snia.org/tech_activities/standards/curr_standards/ltfs on Nov. 11, 2020.

* cited by examiner

US 11,640,373 B2

REORDERING FILES

BACKGROUND

The present invention relates to hierarchical storage management, and more specifically, this invention relates to reordering files on a magnetic tape by read order.

Random access nonvolatile memory devices such as hard disk drives (HDDs) and solid state drives (SSDs) tend to write and read data very quickly due to the inherent time savings associated with the ability to randomly access storage sectors and cells.

In contrast, in append-only media such as magnetic tape, data is conventionally written from the beginning of the tape media and additional data is added to the end of the data on the tape media. This is due to shingled writing, which does not allow overwrite of random areas of tape. It is time consuming to locate the longitudinal end of the tape (e.g., about 1.5 minutes), so if the end of data is toward the longitudinal end, it can take a long time before the new or updated data can be written. It is also time consuming to read files stored at different positions on the tape media due to the seek time to move to the next file.

SUMMARY

A method, according to one general embodiment, includes, for files in a storage system requested in sequence by an application, identifying a pre-file and identifying a post-file requested after the pre-file. The method also includes incrementing a pre-read count for the pre-file in file attributes associated with the pre-file and incrementing a post-read count for the post-file in file attributes associated with the post-file. The method includes selecting a position in a save list for each file based on the pre-read and post-read counts and saving the files on tape media according to the relative positions of the files in the save list.

A computer program product, according to another embodiment, includes one or more computer readable storage media and program instructions collectively stored on the one or more computer readable storage media. The program instructions includes program instructions to perform foregoing method.

A system, according to yet another embodiment, includes a processor and logic integrated with the processor, executable by the processor, or integrated with and executable by the processor. The logic is configured to perform the foregoing method.

Other aspects and approaches of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred aspects of systems, methods, and computer program products for reordering files on a magnetic tape by read order.

In one general embodiment, a method includes, for files in a storage system requested in sequence by an application, identifying a pre-file and identifying a post-file requested after the pre-file. The method also includes incrementing a pre-read count for the pre-file in file attributes associated with the pre-file and incrementing a post-read count for the post-file in file attributes associated with the post-file. The method includes selecting a position in a save list for each file based on the pre-read and post-read counts and saving the files on tape media according to the relative positions of the files in the save list.

In another general embodiment, a computer program product includes one or more computer readable storage media and program instructions collectively stored on the one or more computer readable storage media. The program instructions includes program instructions to perform foregoing method.

In another general embodiment, a system includes a processor and logic integrated with the processor, executable by the processor, or integrated with and executable by the processor. The logic is configured to perform the foregoing method.

Figure 1:
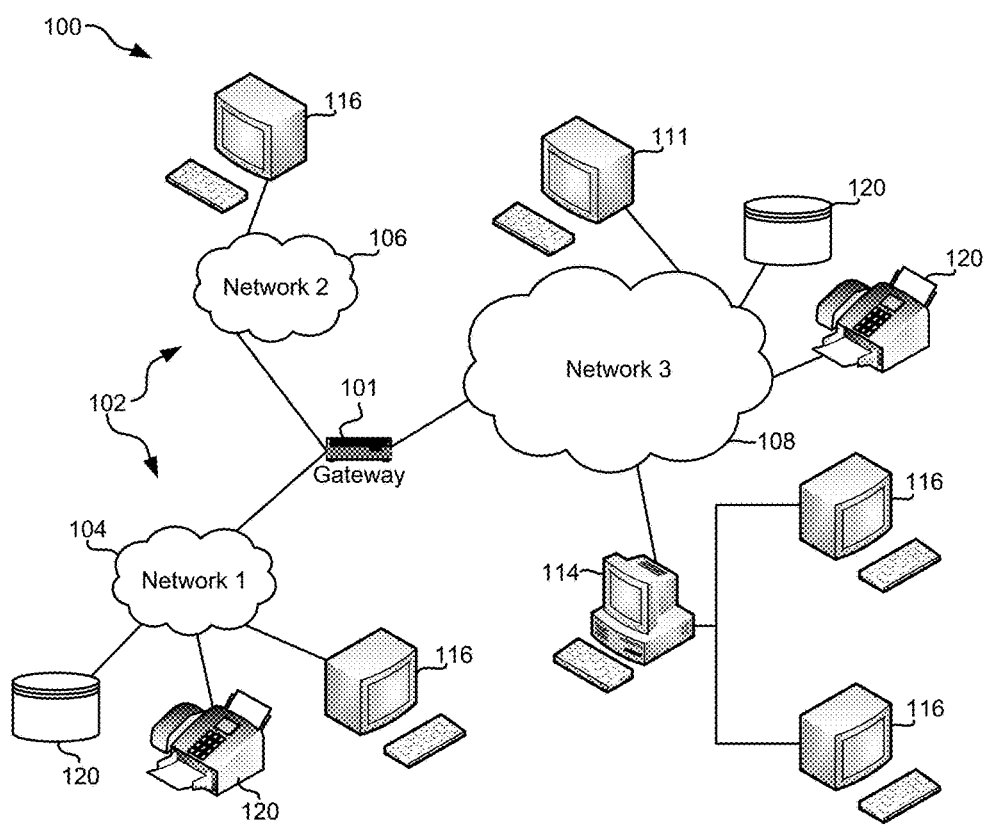
FIG. 1 is a diagram of a network architecture, in accordance with one aspect of the present invention.

FIG. 1 illustrates an architecture 100, in accordance with one aspect. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer, or any other type of logic. It should be noted that a user device 111 may also be directly coupled to any of the networks, in one aspect.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment (IBM and all IBM-based trademarks and logos are trademarks or registered trademarks of International Business Machines Corporation and/or its affiliates), a UNIX® system which virtually hosts a known operating system environment, an operating system which emulates an IBM® z/OS® environment, etc. This virtualization and/or emulation may be enhanced through the use of VMware® software, in some aspects.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
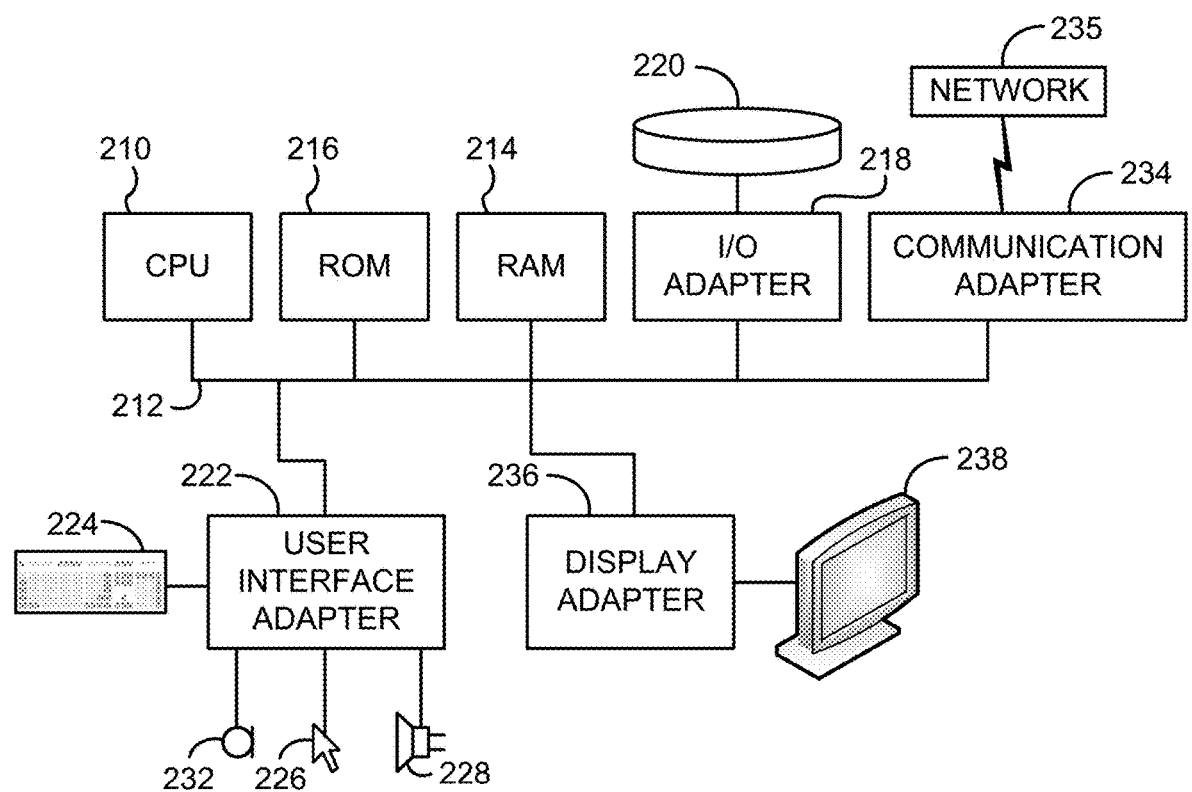
FIG. 2 is a diagram of a representative hardware environment that may be associated with the servers and/or clients of FIG. 1, in accordance with one aspect of the present invention.

FIG. 2 shows a representative hardware environment associated with a user device 116 and/or server 114 of FIG. 1, in accordance with one aspect. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a macOS®, a UNIX® OS, etc. It will be appreciated that a preferred aspect may also be implemented on platforms and operating systems other than those mentioned. A preferred aspect may be written using eXtensible Markup Language (XML), C, and/or C++ language, or other programming languages, along with an object oriented programming methodology. Object oriented programming (OOP), which has become increasingly used to develop complex applications, may be used.

Figure 3:
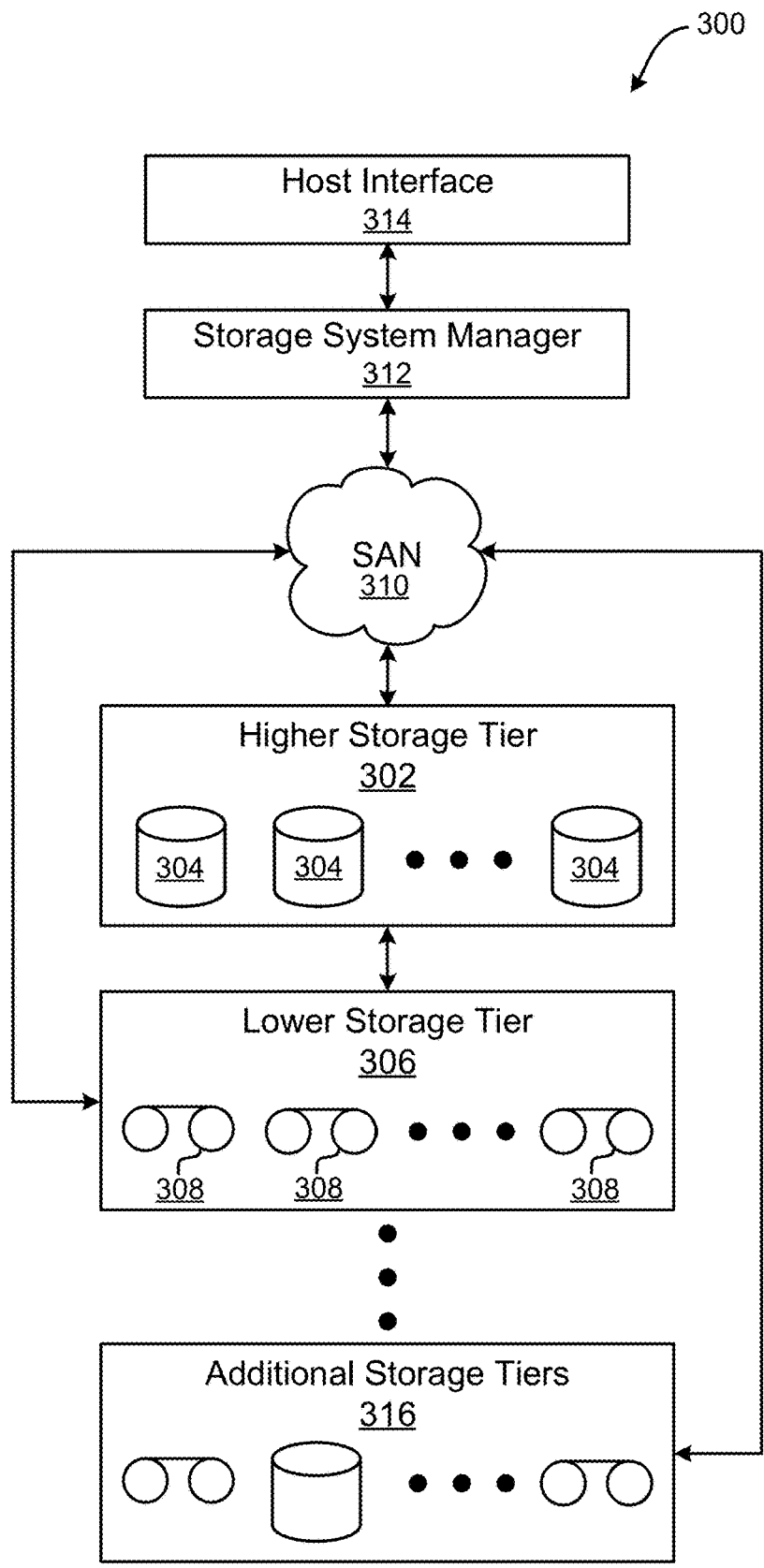
FIG. 3 is a diagram of a tiered data storage system, in accordance with one aspect of the present invention.

Now referring to FIG. 3, a storage system 300 is shown according to one aspect. Note that some of the elements shown in FIG. 3 may be implemented as hardware and/or software, according to various aspects. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more aspects, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the aspects presented herein.

According to some aspects, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various aspects.

In an exemplary hierarchical storage system, users and applications write files to HDDs, SSDs or other relatively faster storage drives so that the data may be quickly received from the users and applications, thereby avoiding the latency inherent in tape storage. Then the files are saved to magnetic tape media according to defined timing policies. For example, IBM Spectrum® Archive Enterprise Edition enables policy management of tape media. Data is conventionally written from the beginning of the tape media and additional data is added to the end of the data on the tape media. As noted above, it is time consuming to locate the longitudinal end of the tape (e.g., about 1.5 minutes), and also time consuming to read files having portions located in different positions on the tape media due to the seek time to find the various portions. As also noted above, the data has conventionally not always been read in the order that the data was written, which again requires recompilation of the data.

Various aspects of the present disclosure include observing the order in which files are read out by applications, saving information about that order, and then using such information to determine an order for the files to be written to tape so that the files can be read consecutively from tape, thereby reducing seek time when the files are recalled from tape. The information saved may include file IDs, read counts, associated dates and/or times of a file read before and a file read thereafter, etc., to the file attributes and generating a save list based thereon. The position of the files on the tape and/or the read out order of the files on the tape may also be based at least in part on files having relatively higher read counts being positioned before files having relatively lower read counts (e.g., files having higher read counts are positioned toward the beginning of the tape media associated with a relatively faster seek time and files having lower read counts are positioned toward the end of the tape media associated with a longer seek time).

For context, much of the present description describes writing data to HDD as the initial random access storage device receiving the data that will ultimately be written out to tape. It should be understood that the description referring to HDD is done by way of example only, and use of other random access storage devices such as SSD, etc. may be used in an equivalent manner. Moreover, the HDD, SSD is typically part of a higher storage tier, while tape is used in a lower storage tier, such as the storage tiers described with reference to FIG. 3.

In some aspects, a "file read-out order management process" and/or a "file rearrangement process" are added to hierarchical storage management (HSM) functions. The file read-out order management process derives an ideal file write-in order (e.g., referred to interchangeably as a save list throughout the present disclosure) to tape media by tracking and managing a file read-in order by each application, predefined applications, etc. The file rearrangement process controls a file write-in order to tape media according to the order derived by the file read-out order management process. Said another way, the order in which files are requested from the storage system by one or more applications is observed, and when the files are migrated to tape, the order they are written to tape is determined based on the observations.

In some exemplary approaches, IBM Spectrum® Archive Enterprise Edition may implement at least some of the operations described herein. In other approaches, the various operations of the present disclosure may be modified and/or implemented in any file system having an HSM function without limitation, as would be understood by one having ordinary skill in the art. In an HSM such as IBM Spectrum® Archive Enterprise Edition, a file written by an application is saved in HDD (again, HDD is used by way of example only) and later copied from HDD to tape media according to a policy applied after the lapse of designated time, e.g., since the file was last requested. The file is deleted from HDD as needed, e.g., to free storage space thereon for more frequently requested files.

A state in which a file exists only in HDD is referred to as a resident state. A state in which a file exists in both HDD and on tape media is referred to as a pre-migrated state. A state in which a file exists only on tape media is referred to as a migrated state. An application may read a file from HDD if the file is saved in HDD. In response to a file in a migrated state being read out, the file is copied from the tape media to HDD and brought into a pre-migrated state. The foregoing process is referred to as a recall.

Figure 4:
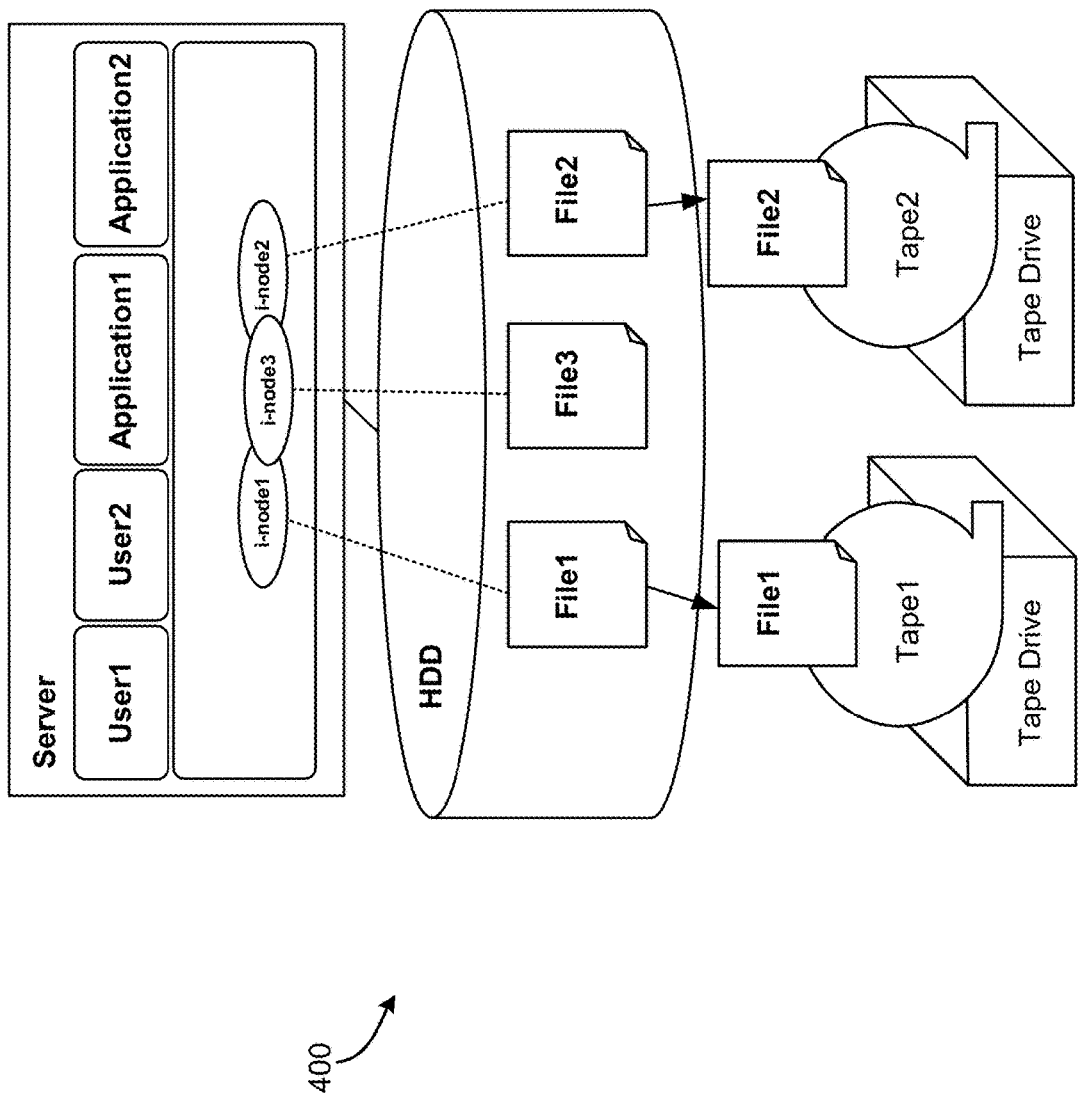
FIG. 4 is an exemplary system configuration, in accordance with one aspect of the present invention.

FIG. 4 depicts an exemplary system configuration 400, in accordance with one aspect. As an option, the present exemplary system configuration 400 may be implemented in conjunction with features from any other aspect listed herein, such as those described with reference to the other FIGS. Of course, however, such exemplary system configuration 400 and others presented herein may be used in various applications and/or in permutations which may or may not be specifically described in the illustrative aspects listed herein. Further, the exemplary system configuration 400 presented herein may be used in any desired environment.

In conjunction with each read-out of a file by an application, the file read-out order management process associates, with the file, a process ID of the application, the i-node number of the read-out file, and the read-out time associated with the file. The file read-out order management process saves the files and/or an associated save list. Behavior of the file read-out order management process is described in detail below.

For example, recording of the file read-out order in system configuration 400 may include saving the files (e.g., File1, File2, File3) in HDD by applications (e.g., Application1, Application2) and/or users (e.g., User1, User2). File1 is read out by a first process on the Server. The file read-out order management process records the ID of the process (e.g., Process 1, not shown), the i-node number of the file (e.g., i-node1, i-node2, i-node3) and a read-out time (e.g., a new read-out time hereinafter). File2 is subsequently read out by the first process having a process ID of Process 1. The file read-out order management process identifies that different files were accessed continuously and/or consecutively by the same process ID, and information is created based on the detected order the files were read out. In preferred approaches, accessing files continuously and/or consecutively by the same process refers to files which are read immediately one after the other (e.g., file A is read continuously with file B when there is no other file between file A and file B). In further preferred approaches, no substantial period of time (e.g., greater than a predetermined period of time between reading files) occurs between accessing files continuously and/or consecutively by the same process as would be understood by one having ordinary skill in the art upon reading the present disclosure. Under the extended file attributes of File1 (e.g., of the i-node of File1), the i-node number of the subsequent File2 is saved as postfile1.no and the "post-read count" of 1 is saved as postfile.count. The latest read-out time is saved as postfile1.time in the file attributes of File1.

Exemplary extended file attributes and exemplary read-out counts (e.g., pre-read counts and post-read counts) saved under the extended file attributes are shown below:

$ getfattr -d fileA
file: fileA
postfile1.no="6556316"
postfile1.count="1"
postfile1.time="1560152792"
postfile2.no="4199307"
postfile2.count="10"
postfile2.time="1560152842"

Under the extended file attributes of the File2, the i-node number of the previous file (e.g., File1) is saved as prefile1.no, the "pre-read count" thereof is saved as prefile1.count=1 and the latest read-out time is saved as prefile1.time. If another file is read out by the first process, the extended file attributes are processed as described in detail above. The various operations may be repeated by the file read-out order management process.

If File1 is read out again and the file which is read out subsequently by the same process is File2, the number saved as postfile1.count in relation to File2 under the extended file attributes of File1 is increased by one and the read-out time is saved as postfile1.time. The number is saved as prefile1.count in relation to File1 under the extended file attributes of File2. The pre-file count is increased by one and the read-out time is saved as prefile1.time. Although the process as described herein may be a different process from the aforementioned first process, it may be assumed that the files File1 and File2 are read out continuously or consecutively by a single process. For example, the file may be overwritten in the current process in contrast to a file which is written to another tape (e.g., becoming a different file when the file is overwritten).

If File1 is read out again and File3 is subsequently read out, the i-node number of File3 is saved as postfile2.no under the extended file attributes of the File1. The postfile2.count=1 is saved. The read-out time is saved as postfile2.time under the extended file attributes of File1. The i-node number of File1 is saved as prefile1.no under the extended attributes of File3. The "pre-read count" is saved as 1 and the read-out time is saved under the extended file attributes of File3. At this time, the i-node number, the "post-read count," etc., of File2 are saved under the extended attributes of File1 and preferably kept without being overwritten and/or modified. In other words, File1 attributes include postfile1 for File2, postfile2 for File3, etc., in the order of files read after File1 is read.

In one example, the number of files read out after File1 is increased in such a manner that File1 is read out and followed by a read-out of File4 (not shown). File1 is read out subsequently. A read-out of File5 (not shown) follows the last read-out of File1. The maximum size of the i-node is predetermined. The i-node number, the pre-read count, the post-read count, each read-out time, etc., are saved for the maximum number of files (e.g., in one preferred approach, five files). In one approach, the maximum number of files may be limited by the size of the i-node. For example, an i-node size of 464 bytes may have a maximum number of five files. In other approaches, the maximum number of files may be based at least in part on how many attributes are used for other purposes, depending on the design of the system, as would be determinable by one having ordinary skill in the art in view of the present disclosure.

If the number of files exceeds the maximum number of files (e.g., five, in the foregoing example), files which are greater than or equal to a predetermined time period, for example, a day "old" (e.g., 24 hours post-read, 24 hours since last access and/or read-out), are deleted in an order starting from the file with the oldest read-out time such that the i-node number, etc., of a new read-out file is added under the extended file attributes. If there are no files of more than one day old, a file with the least read-out count (e.g., the smallest value associated with the read count relative to other values associated with other read counts) is deleted first in a preferred approach. If there are files having the same read count, a file with an older read-out time is deleted first so that the i-node number, etc., of a new read count file are added under the extended file attributes, as would be understood by one having ordinary skill in the art upon reading the present disclosure.

Figure 5:
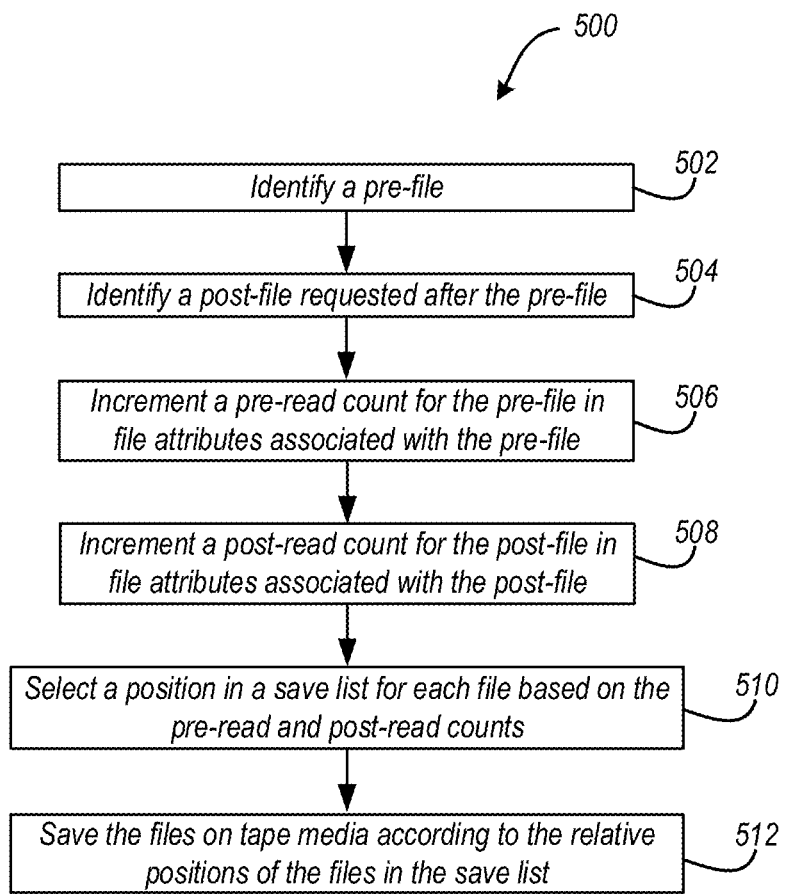
FIG. 5 is a flowchart of a method, in accordance with one aspect of the present invention.

Now referring to FIG. 5, a flowchart of a method 500 is shown according to one aspect. The method 500 may be performed in accordance with the present invention in any of the environments depicted in FIGS. 1-4, among others, in various aspects. Of course, more, or fewer operations than those specifically described in FIG. 5 may be included in method 500, as would be understood by one of skill in the art upon reading the present descriptions.

Each of the steps of the method 500 may be performed by any suitable component of the operating environment. For example, in various aspects, the method 500 may be partially or entirely performed by computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

In preferred approaches, method 500 is for generating a save list of files in a storage system, and using the save list to write files to relatively slower storage in an order that minimizes latency. The storage system may be any type of storage system known in the art and may comprise more or less components than those described herein. In a preferred approach, the storage system is configured to use relatively faster storage as primary storage and relatively slower storage as secondary storage. In preferred configurations, files on the save list are initially stored on the relatively faster storage. The relatively faster storage preferably includes storage drives selected from Flash storage, HDD, SSD, and the like. Method 500 preferably includes migrating the files on the save list to relatively slower storage after a first predetermined period of time has elapsed since some predefined event, such as a last access of the file(s), etc. The relatively slower storage includes sequential access storage media, such as tape media, or equivalently optical media. The first predetermined period of time may be set by a user, a manufacturer, a default setting, etc. The first predetermined period of time may be determined and set in any manner known in the art. In exemplary approaches, the first predetermined period of time is one week, one month (30 days), etc.

As shown in FIG. 5, method 500 includes operation 502. Operation 502 includes, for files in a storage system requested in sequence by an application, identifying a pre-file. A pre-file may be a file which was requested before another file, as identified in any known manner as would be determinable in any manner by one having ordinary skill in the art. In preferred aspects, the pre-file includes a file ID and a date and time associated with the pre-file. A file ID may be any sequence of characters (e.g., alphanumeric, etc.) which uniquely identify the file. For example, a file ID may be based at least in part on an i-node number associated with the file. In various approaches, files requested in sequence may be interchangeably referred to as files read continuously. In preferred approaches, accessing files continuously and/or consecutively by the same process refers to files which are read immediately one after the other (e.g., file A is read continuously with file B when there is not another file between file A and file B). In further preferred approaches, no substantial period of time (e.g., greater than a predetermined period of time between reading files) occurs between accessing files continuously and/or consecutively by the same process as would be understood by one having ordinary skill in the art upon reading the present disclosure. In an illustrative example, method 500 may refer to at least two files being read in sequence, a first file being identified as a pre-file and a second file being identified as a post-file (see operation 504 below).

Operation 504 includes, for files requested in sequence by the same application in the storage system, identifying a post-file, as identified in any known manner as would be determinable in any manner by one having ordinary skill in the art. A post-file may be a file which is requested after the pre-file. In preferred approaches, the post-file is a file which is requested immediately after the pre-file (e.g., no file is requested between the post-file and the pre-file). In preferred aspects, the post-file includes a file ID and a date and time associated with the post-file.

Operation 506 includes incrementing a pre-read count for the pre-file in file attributes associated with the pre-file. The file attributes may comprise any information associated with the file including pre-read counts, post-read counts, file IDs, read-out start times, read-out end times, access counts, etc. The file attributes preferably include the i-node of the file. Any other attributes associated with any other files may be stored in the file attributes, in any manner as would be understood by one having ordinary skill in the art. The file attributes may be stored in any manner known in the art in association with the file. In a preferred approach, the file attributes are stored in a table in association with the file.

A pre-read count is preferably associated with a value. The pre-read count value increases by one for every corresponding request of the pre-file, in preferred approaches, as would be understood by one having ordinary skill in the art in view of the present disclosure. A value associated with a pre-read count and/or a post-read count may be determined in each system through comparison with the read counts associated with the system and/or comparison with the read counts associated with the maximum number of saved files.

Operation 508 includes incrementing a post-read count for the post-file in file attributes associated with the post-file. A post-read count is preferably associated with a value. The post-read count value increases by one for every corresponding request of the post-file, in preferred approaches, as would be understood by one having ordinary skill in the art in view of the present disclosure.

In various approaches, operations 502, 504, 506, and 508 comprise a first phase of the method 500 for accumulating the read counts for the file attributes of files in the storage system. The read counts may be checked for each file of a resident file list to migrate, in some approaches, as described below. The read counts may be checked for each file to rearrange the files in a pre-migrated file list, in other approaches, as described below.

Operation 510 includes selecting a position in a save list for the file based on the pre-read and post-read counts. For example, selecting the position may include ranking the pre-files based at least in part on pre-read count values associated with the pre-files and ranking the post-files based at least in part on post-read count values associated with the post-files. In preferred approaches, the file is positioned relatively earlier in the save list (e.g., toward the beginning of the tape media) based on a ranking of the post-files and pre-files. The post-file preferably has a higher post-read count than the pre-file and the pre-file preferably has a higher pre-read count than the post-file. In various approaches, the pre-read counts are compared and ranked, and the post-read counts are compared and ranked. In preferred aspects, a file having both a higher pre-read count and a higher post-read count is positioned farther ahead (e.g., toward the beginning of the tape media) than a file having a lower pre-read count and/or a lower post-read count.

Operation 512 include saving the files on the relatively slower storage, e.g., tape media, according to the relative positions of the files in the save list. The files may be saved on the tape media in any manner known in the art.

In various approaches, the read counts may be used when a file is saved on tape media as discussed in detail below. The timing at which a file is saved on tape media may be changed by a user setting in one approach. The timing associated with the read count may be changed in response to the read count reaching a predetermined value. If conditions to proceed to a pre-migrated state are satisfied, the HSM function causes a file to be saved on tape media. Conventional management processes save files in the order designated by the user and/or in an order determined by an HSM function. In stark contrast, various operations of the present disclosure provide a save list order for saving the files by confirming information written in the i-node by the "file rearrangement process" when any files are saved on tape media.

In one example, in response to saving an arbitrary file (e.g., file A) on tape media, the file rearrangement process confirms the read counts, the date, and/or times of the files read before and after file A, as written in the i-node. Extremely old pre-read counts and/or post-read counts may be excluded (e.g., pre-files and/or post-files which are greater than or equal to one month old from the last read date and/or time thereof) in at least some approaches. The i-node of a file (e.g., file X) whose number of post-read counts (e.g., postfilen.count) in relation to file A is confirmed. If the file X also has the highest pre-read count in relation to file A, file A and file X are saved continuously and/or consecutively in the save list and the files are saved continuously and/or consecutively in corresponding storage media. If a file other than file A (e.g., file W) was previously read-out relatively more frequently prior to file X compared to file A, no further additions to the continuous save list are made. For example, file A is not saved continuously with file X. In this scenario, file A is saved to another file list for migration which is made prior to the continuous save list (e.g., the file list comprises files used for initially accumulating the file attributes). This file list may be used to determine the save list where the post-read counts and the pre-read counts are checked and compared for the files stored at the top of the file list to create the save list, in at least some approaches. File A may be migrated alone without rearrangement in the order of the file list for migration (e.g., file A is saved alone to the save list in the above example).

In the foregoing example, if file A and file X are saved continuously and/or consecutively in the save list, the file attributes of file X are confirmed. If a new file Y has a higher postfilen.count, files read out before the file Y are confirmed with corresponding read counts. This process is continued in the same matter hereinafter until there are no continuous files, in a manner as would be determinable by one having ordinary skill in the art in view of the present disclosure.

In preferred aspects, a file having both a higher pre-read count and a higher post-read count is stored earlier on the tape media (e.g., toward the beginning of the tape media) than a file having both a lower pre-read count and a lower post-read count. For example, if File X has the greatest post-read count of the attributes of File A, and File A has the greatest pre-read count of the attributes of File X, File A and File X are saved continuously (e.g., in that order) on the tape media.

In response to determining that there are no continuous files, the process starts storing files in the completed, continuous, save list on tape media in at least some approaches. If continuous files are in the resident state, the files are stored on tape media according to the order in the save list. Continuous files in the pre-migrated state are deleted and written continuously in different tape media. If continuous files are partially in the migrated state, due to prolonged time for recall, these files are left as-is and only the files in the resident and/or pre-migrated state are written continuously in a tape. Files in the migrated state are left as-is. The processing speed is not reduced by the collection of files other than files in the migrated state.

Files in a pre-migrated state which are rewritten on different tape media and deleted from the original tape media may reclaim storage on the original tape media in response to more space becoming available (e.g., "repacking" the remaining data in different tape media). For example, when a written tape has space greater than a predetermined threshold (e.g., greater than 70%), the tape may be reclaimed in a process including deleting less frequently used files and copying any remaining files to another tape (e.g., leaving the original tape empty for reuse). In order to prevent system performance from being affected due to increased tape reclaim, relatively new files saved in HDD and read out more frequently are saved on tape media according to delayed timing. If the frequency of rewriting a file in the pre-migrated state exceeds a certain threshold, rearrangement is applied to files in the resident state and rewriting of files in the pre-migrated state is canceled. The rearrangement is applied only to files in the resident state such that the processing speed of reading does not decrease.

Method 500 optionally includes excluding post-files from the save list after a second predetermined period of time following an access to at least one of the files. The second predetermined period of time may be set by a user, a manufacturer, a default setting, etc. The second predetermined period of time may be determined and set in any manner known in the art. In a preferred approach, the second predetermined period of time is 1 day (24 hours).

Figure 6:
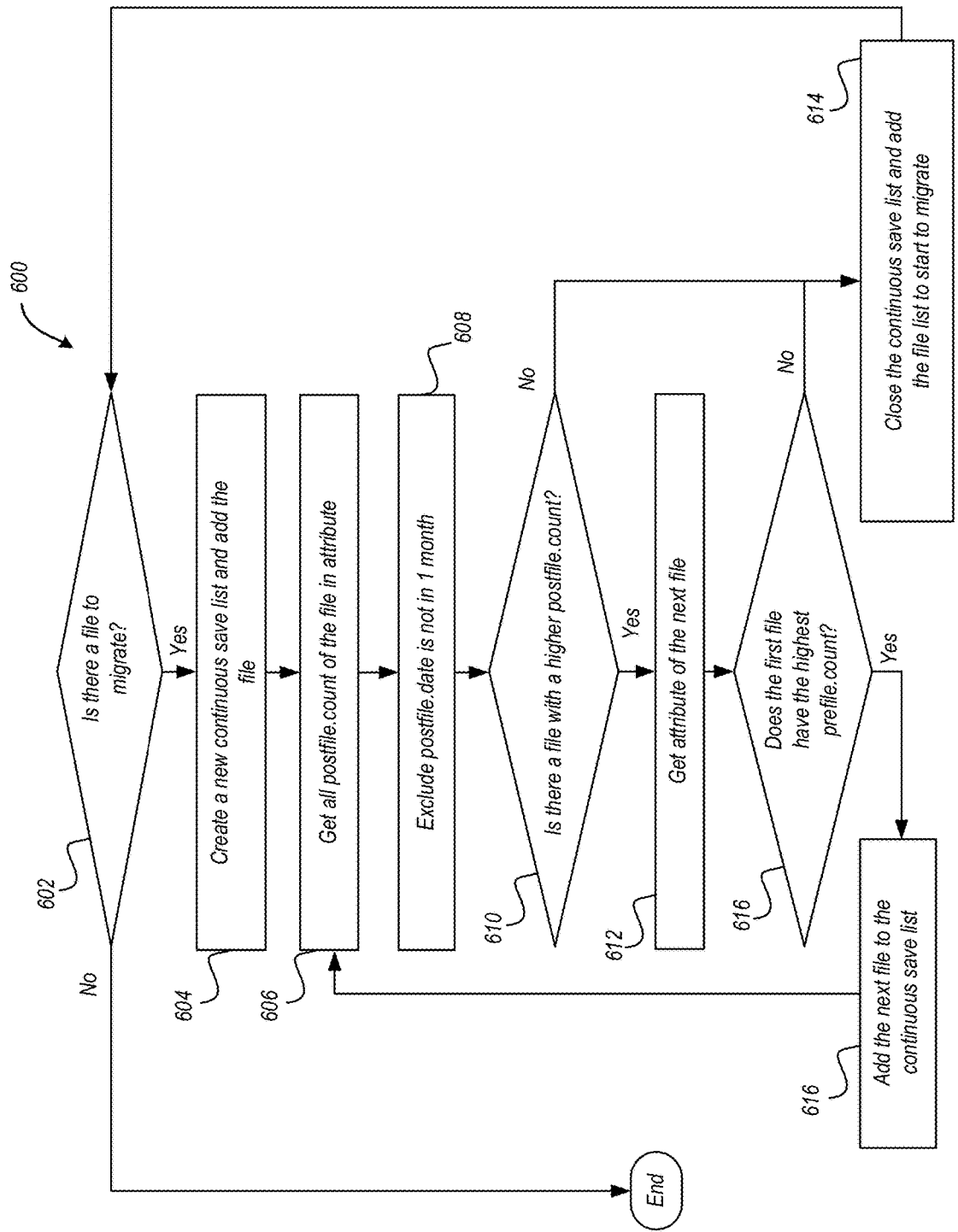
FIG. 6 is an exemplary flow diagram for creating a file access order, in accordance with one aspect of the present invention.

FIG. 6 is an exemplary flow diagram of a process 600 for creating a file access order. FIG. 6 includes an exemplary use case implementing at least some of the aspects described with reference to method 500. The operations of FIG. 6 illustrate the exemplary use case, and the order of operations is not meant to be deemed limiting in any way.

FIG. 6 includes decision block 602 for determining whether there is a file to migrate. If there is no file to migrate, the process 600 ends. If there is a file to migrate, the process 600 continues to create a new continuous save list and adds the file to the continuous save list in operation 604. Operation 606 includes determining the postfile.count associated with the file from the file attributes. In various approaches, the process 600 may include operation 608 for excluding any postfile.date which is not within 1 month, according to various aspects described herein. Decision block 610 compares all the postfile.counts for the file (e.g., except for any postfile.counts which are excluded by operation 608) to each other. The file with the highest postfile.count (e.g., in the file attributes of file) is determined. For example, the postfile1.count (for File X read after File A) and the postfile2.count (for File Y read after File A) are compared. Decision block 610 includes determining whether there is file with a higher postfile.count. If the postfile.count of the next file is greater than the postfile.counts of the other files in the file attributes of the first file, operation 612 includes receiving the attributes of the next file (e.g., a new file). If the postfile.count of the next file is not greater than the postfile.counts of the other files in the file attributes of the first file, the process 600 proceeds to operation 614 to close the continuous save list and the adds the file to the file list for migration. After receiving the attributes of the next file in operation 612, decision block 616 includes determining whether the first file has the highest prefile.count (e.g., determining whether the first file is the first file in a continuous save list by determining whether the first file has a pre-file). If the first file has the highest prefile.count, the next file is saved to the continuous save list and the flow diagram returns to operation 606 for receiving the file attributes of the new file for determining the file access order. If the first file does not have the highest prefile.count, the process 600 proceeds to operation 614 to close the continuous save list and adds the file to the file list for migration. The continuous save list may be created with the first file. Files in the save list are migrated to the tape media without rearrangement. If the file is already stored on the tape media in a pre-migration state, the file is not copied to another tape and the file is moved to the migration state as would become apparent to one having ordinary skill in the art in view of the present disclosure.

Various operations of the foregoing method enable prompt and continuous file read-outs by collecting files which are read out continuously and/or consecutively. In contrast, conventional methods do not perform such file collection. For example, if a first file and a subsequent file are placed at different positions on the same tape, it may take up to 45 seconds on average (up to 1.5 minutes maximum) to locate a subsequent file for JE media located in an IBM TS1160 tape drive. At least some approaches of the present disclosure eliminate the time spent for locating a subsequent file. For example, in a conventional system, if an initial file and a subsequent file are placed on different tapes, the different tapes are loaded onto drives to locate and read the desired file. It may take another 12 seconds on average to load the tapes. If there is no space (e.g., the tape drives are occupied) in the drive, the tape occupying the tape drive must be rewound and unloaded (e.g., another 102 to 173 seconds). Thus, even if the time spent for reading and replacing tapes by a robot arm installed in a tape library is excluded, it takes about 3 to 5 minutes to rewind, unload, load, and locate files in conventional systems. Various aspects of the present disclosure reduce the time for locating files to about zero.

In yet another approach of the method disclosed herein, the file access order may be analyzed by analysis software (e.g., statistical product and service solutions (e.g., IBM SPSS®) software). A sufficient access history would be required for each file, as would be determinable by one having ordinary skill in the art. The system using a tape media for archived data typically does not experience a high frequency of access of that data. It would be effective to use approaches which allow extraction of files to be read out continuously without having high read counts as would be understood by one having ordinary skill in the art. Several tapes may be mounted at the same time and simultaneously read files in parallel. This configuration may be relatively faster than reading the same files continuously from the same tape. It may be relatively more difficult to realize substantially simultaneous read-outs of files from different tapes while other files are read out.

A compressed file may be read out from a tape at a high speed of about 900 MB/s. Locating files takes an average time of 45 seconds during which about 40 GB may be read out. Files of several gigabytes may be read out more quickly by arranging these files on a single tape according to the various operations described in detail above. Additionally, in the case where the number of tape drives is limited and/or there is a large number of tapes in the system, tapes to be read out may be mounted at the same time. In the foregoing case, tape replacement (e.g., unloading and loading of tape media) occurs frequently in the system. Writing files continuously on a single tape according to various aspects of the present disclosure would be relatively more efficient compared to conventional methods.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to aspects of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various aspects may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that aspects of the present invention may be provided in the form of a service deployed on behalf of a customer to offer service on demand.

The descriptions of the various aspects of the present invention have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

What is claimed is:

1. A method, comprising:
   for files in a storage system requested in sequence by an application:
   identifying a pre-file;
   identifying a post-file requested after the pre-file;
   incrementing a pre-read count for the pre-file in file attributes associated with the pre-file;
   incrementing a post-read count for the post-file in file attributes associated with the post-file; and
   selecting a position in a save list for each file based on the pre-read and post-read counts; and
   saving the files on tape media according to the relative positions of the files in the save list.

2. The method of claim 1, wherein the storage system is configured to use relatively faster storage for primary storage, wherein the storage system is configured to use relatively slower storage for secondary storage.

3. The method of claim 2, wherein the files on the save list are initially stored on the relatively faster storage, wherein the relatively faster storage includes storage drives selected from the group consisting of: Flash storage, HDD, and SSD.

4. The method of claim 2, comprising migrating the files on the save list to the relatively slower storage after a first predetermined period of time, wherein the relatively slower storage includes the tape media.

5. The method of claim 1, wherein the post-file includes a file ID and a date and time associated with the post-file.

6. The method of claim 1, wherein the pre-file includes a file ID and a date and time associated with the pre-file.

7. The method of claim 1, comprising excluding post-files from the save list after a second predetermined period of time following an access to at least one of the files.

8. The method of claim 1, wherein selecting the position includes ranking the pre-files based at least in part on pre-read count values associated with the pre-files, wherein selecting the position includes ranking the post-files based at least in part on post-read count values associated with the post-files.

9. A computer program product, the computer program product comprising:
   one or more computer readable storage media, and program instructions collectively stored on the one or more computer readable storage media, the program instructions comprising:
   for files in a storage system requested in sequence by an application:
   program instructions to identify a pre-file;
   program instructions to identify a post-file requested after the pre-file;
   program instructions to increment a pre-read count for the pre-file in file attributes associated with the pre-file;
   program instructions to increment a post-read count for the post-file in file attributes associated with the post-file; and program instructions to select a position in a save list for each file based on the pre-read and post-read counts; and program instructions to save the files on tape media according to the relative positions of the files in the save list.

10. The computer program product of claim 9, wherein the storage system is configured to use relatively faster storage for primary storage, wherein the storage system is configured to use relatively slower storage for secondary storage.

11. The computer program product of claim 10, wherein the files on the save list are initially stored on the relatively faster storage, wherein the relatively faster storage includes storage drives selected from the group consisting of: Flash storage, HDD, and SSD.

12. The computer program product of claim 10, comprising program instructions to migrate the files on the save list to the relatively slower storage after a first predetermined period of time, wherein the relatively slower storage includes the tape media.

13. The computer program product of claim 9, wherein the post-file includes a file ID and a date and time associated with the post-file.

14. The computer program product of claim 9, wherein the pre-file includes a file ID and a date and time associated with the pre-file.

15. The computer program product of claim 9, wherein selecting the position includes ranking the pre-files based at least in part on pre-read count values associated with the pre-files, wherein selecting the position includes ranking the post-files based at least in part on post-read count values associated with the post-files.

16. A system, comprising:
a processor; and
logic integrated with the processor, executable by the processor, or integrated with and executable by the processor, the logic being configured to:
for files in a storage system requested in sequence by an application:
identify, by the processor, a pre-file;
identify, by the processor, a post-file requested after the pre-file;
increment, by the processor, a pre-read count for the pre-file in file attributes associated with the pre-file;
increment, by the processor, a post-read count for the post-file in file attributes associated with the post-file; and
select, by the processor, a position in a save list for each file based on the pre-read and post-read counts; and
cause to be saved, by the processor, the files on tape media using a tape drive according to the relative positions of the files in the save list.

17. The system of claim 16, wherein the storage system is configured to use relatively faster storage for primary storage, wherein the storage system is configured to use relatively slower storage for secondary storage.

18. The system of claim 17, wherein the files on the save list are initially stored on the relatively faster storage, wherein the relatively faster storage includes storage drives selected from the group consisting of: Flash storage, HDD, and SSD.

19. The system of claim 17, comprising logic configured to migrate, by the processor, the files on the save list to the relatively slower storage after a first predetermined period of time, wherein the relatively slower storage includes the tape media.

20. The system of claim 16, wherein the post-file includes a file ID and a date and time associated with the post-file, wherein the pre-file includes a file ID and a date and time associated with the pre-file.

* * * * *